United States Patent [19]

Sakamoto et al.

[11] Patent Number: 5,882,452
[45] Date of Patent: Mar. 16, 1999

[54] METHOD AND APPARATUS FOR MANUFACTURING TIRE WITH REDUCED RADIAL RUNOUT

[75] Inventors: Masayuki Sakamoto; Takuya Mizuta; Seiki Yamada; Kazuya Suzuki; Susumu Tanaka; Yukio Endo, all of Shirakawa; Toshihiko Omokawa, Iwase-gun, all of Japan

[73] Assignee: Sumitomo Rubber Industries, Ltd., Kobe, Japan

[21] Appl. No.: 872,880

[22] Filed: Jun. 11, 1997

[30] Foreign Application Priority Data

Jun. 21, 1996 [JP] Japan .................................. 8-181516
Jun. 24, 1996 [JP] Japan .................................. 8-183987
Jun. 24, 1996 [JP] Japan .................................. 8-183988
Jan. 20, 1997 [JP] Japan .................................. 9-022175

[51] Int. Cl.$^6$ .................................................. B29D 30/30
[52] U.S. Cl. .......................... 156/64; 156/111; 156/126; 156/128.1; 156/378; 156/396; 156/406.2

[58] Field of Search .................................. 156/406.2, 75, 156/64, 111, 110.1, 126, 127, 128.1, 394.1, 396, 421.8, 378; 152/154.1

[56] References Cited

U.S. PATENT DOCUMENTS

| | | | |
|---|---|---|---|
| 3,352,732 | 11/1967 | Darr | 156/75 |
| 3,835,591 | 9/1974 | Cimprich | 157/13 |
| 3,926,704 | 12/1975 | Sharp, Jr. | 156/75 |
| 4,502,857 | 3/1985 | Hinks | 425/29 |
| 5,441,587 | 8/1995 | Byerley | 156/406.2 |

FOREIGN PATENT DOCUMENTS 6-182903  7/1994  Japan .................................. 152/154.1

*Primary Examiner*—Geoffrey L. Knable
*Attorney, Agent, or Firm*—Lorusso & Loud

[57] ABSTRACT

Means for measuring deviation measures a vertical deviation of a green tire from circularity while the green tire is clamped by a green tire building drum. The green tire to be formed is shaped into a complete circle according to the measured value.

4 Claims, 11 Drawing Sheets

RRO

RRO

RRO

STITCHER
WHEEL
PRESSURE

METHOD AND APPARATUS FOR MANUFACTURING TIRE WITH REDUCED RADIAL RUNOUT

BACKGROUND OF THE INVENTION

1. Field of the Invention

This invention relates to a method and an apparatus for manufacturing a tire.

2. Description of the Related Art

In a general method for manufacturing a tire, a tread ring building drum forms a tread ring, segments of a transfer which segments are arranged along a circumferential direction and freely reciprocated in a radial direction hold and send the tread ring from the tread ring building drum to a green tire building drum, the green tire building drum unites the tread ring and a carcass ply and forms a green tire, and the green tire is vulcanized.

If a green tire under manufacture has RRO (radial runout, i.e. vertical deviation from circularity), RRO still exists after the tire is vulcanized, and the product lacks uniformity wherein rigidity of the tire is uneven and reaction force upon contacting ground fluctuates due to the deviation from circularity.

It is therefore an object of the present invention to provide a method and an apparatus for manufacturing a tire wherein a tire of good uniformity is manufactured.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 3:
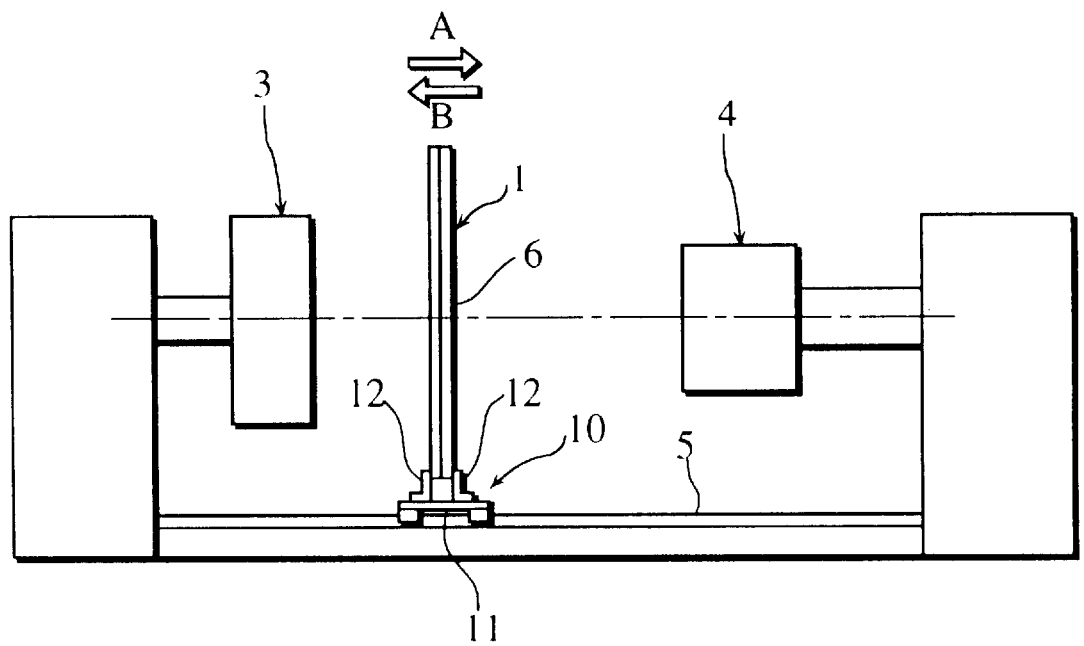
FIG. 3 is a general view of the apparatus for manufacturing a tire.

FIG. 3 shows an apparatus for manufacturing a tire according to the present invention, and this apparatus for manufacturing a tire is provided with a tread ring forming drum 3, a green tire building drum (a raw tire forming drum) 4 facing the tread ring forming drum 3, and a transfer 1 applied between the tread ring forming drum 3 and the green tire building drum 4. This transfer 1 reciprocates along a rail 5 toward arrows A and B owing to a driving apparatus not shown in the attached drawings.

Figure 8:
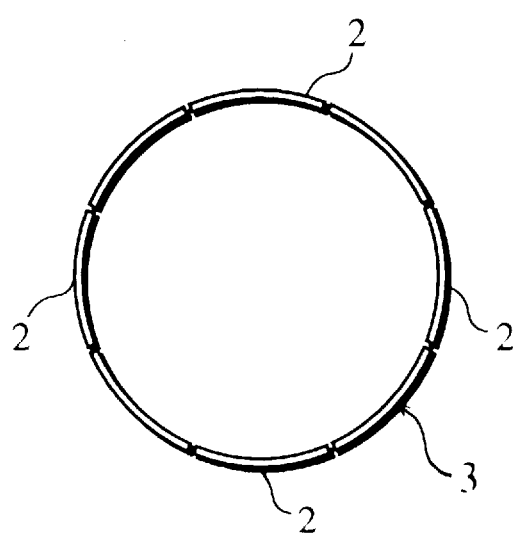
FIG. 8 is a schematic illustration of a tread ring forming drum.

A belt, a band, and a tread material are stuck together and shaped into a ring, and a cylindrical tread ring W (see FIG. 4) is formed. As shown in FIG. 8, the tread ring forming drum 3 possesses segments 2 arranged along a circumferential direction at regular intervals, and the segments 2 freely reciprocate in a radial direction.

Figure 5:
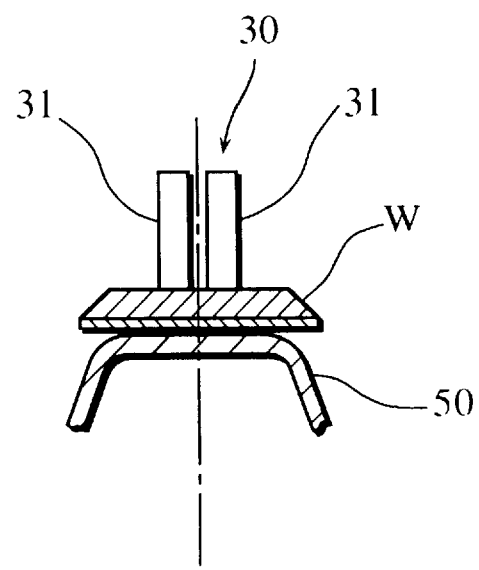
FIG. 5 is a schematic illustration showing a stitcher wheel.
Figure 6:
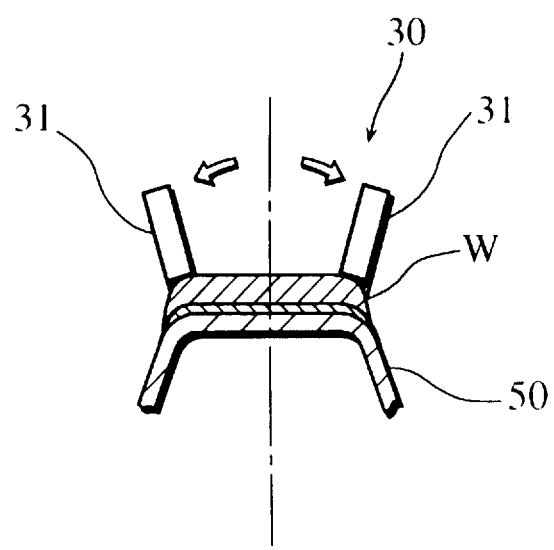
FIG. 6 is a schematic illustration showing movement of the stitcher wheel.

The tread ring W formed by the tread ring forming drum 3 is taken out from the tread ring forming drum 3 by the transfer 1, and is sent to the green tire building drum 4. This green tire building drum 4 unites the tread ring W and a carcass ply 50 (see FIG. 5) and forms a green tire (a raw tire). In other words, the tread ring W sent to the green tire building drum 4 is stuck to a surface of the carcass ply 50 by a stitcher apparatus 30 shown in FIGS. 5 to 7, and a green tire is formed.

The stitcher apparatus 30 is provided with a pair of stitcher wheels (a pair of stitch rollers) 31 which freely rotate and a cylinder 32 which reciprocates the stitcher wheels 31 in directions toward and away from the drum 4. The stitcher wheels 31 move from a central portion of an outer circumferential face of the tread ring W toward a marginal end portion of the outer circumferential face as shown with arrows in FIG. 6.

Along with rotation of the drum 4, the stitcher wheels 31 rotate on their axes and move from the central portion of the outer circumferential face of the tread ring W to the marginal end portion of the outer circumferential face, and the tread ring W is pressed (stuck) to the carcass ply 50.

Figure 4:
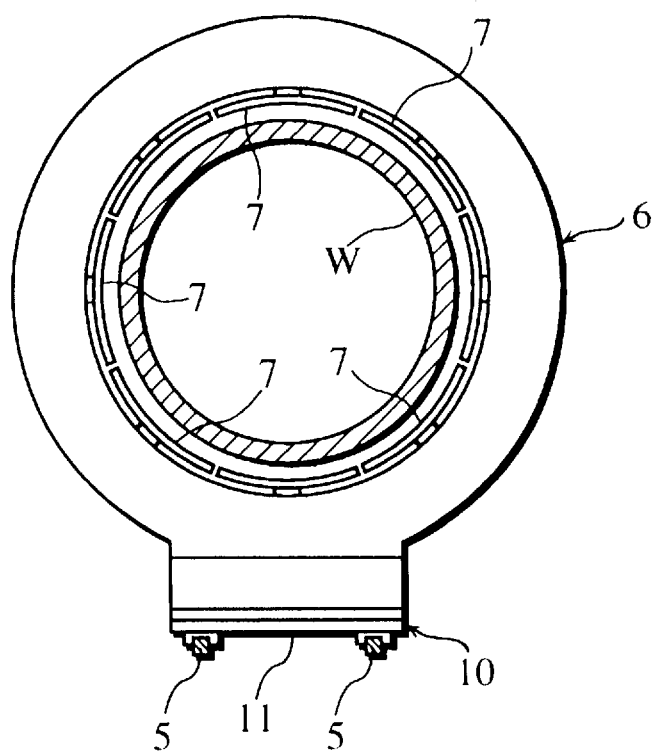
FIG. 4 is a schematic side view of a principal portion of the apparatus for manufacturing a tire.

The transfer 1 is, as shown in FIG. 4, provided with a circular frame 6, segments 7 arranged on the frame 6, and an expansion and contraction mechanism not shown in the attached drawings which reciprocates the segments 7 in a radial direction. The expansion and contraction mechanism is a mechanism, for example, a cylinder mechanism, which is known in public and conventionally used for a transfer.

The circular frame 6 is provided with a traveling object 10 traveling along rails 5, and the traveling object 10 possesses a base plate 11 and a fixing member 12 for keeping the circular frame 6 stand on the base plate 11.

Figure 1:
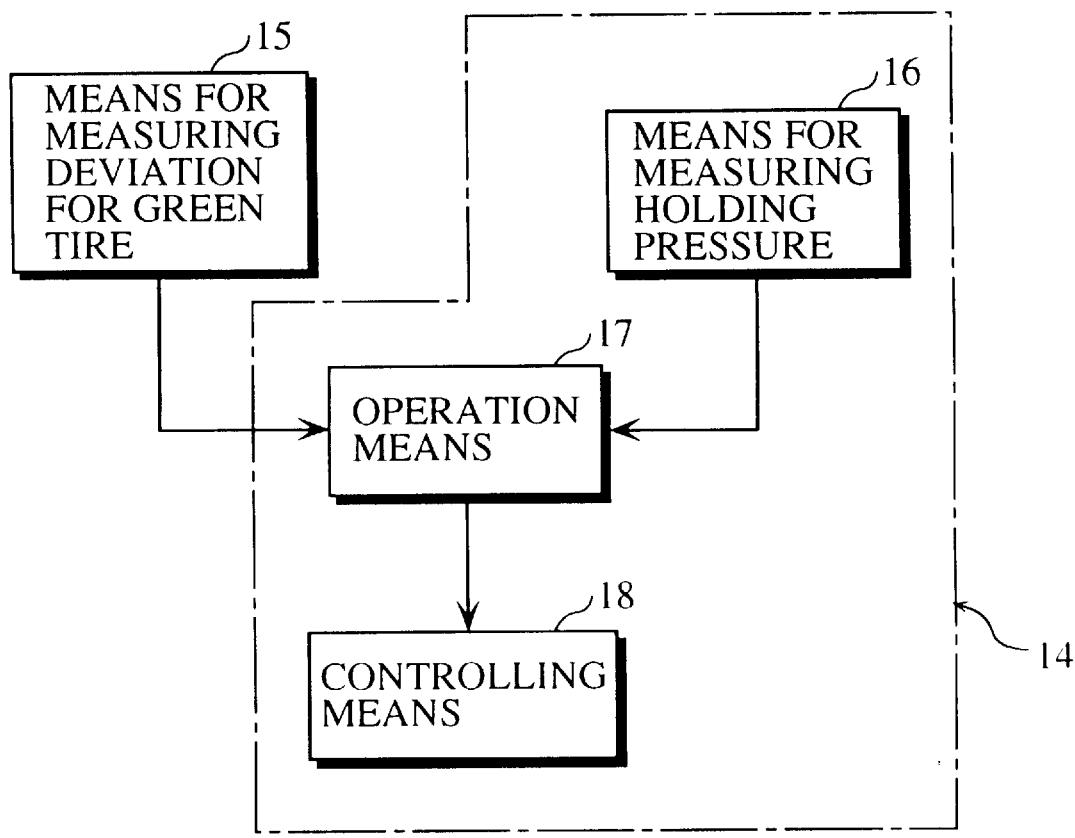
FIG. 1 is a block diagram showing a first apparatus for manufacturing a tire.

As shown in FIG. 1, this apparatus for manufacturing a tire possesses means 15 for measuring deviation for a green tire which measures a vertical deviation of the green tire from circularity (RRO: radial runout) while the green tire is clamped (inflated) by the green tire building drum 4 and correcting means 14 for correcting the tire to be formed into a complete circle on the basis of the measured value. In this case, the correcting means 14 possesses means 16 for measuring holding (grasping) pressure for measuring tread ring holding pressure of each segment 7 of the transfer 1, operation means 17 for comparing the measured deviation obtained from the means 15 for measuring deviation and the measured holding pressure obtained from the means 16 for measuring holding pressure and operating next tread ring holding pressure of each segment 7, and controlling means 18 for arranging a pressure at which each segment 7 holds the tread ring on the basis of the value operated by the operation means 17.

The means 16 for measuring holding pressure comprises, for example, a pressure sensor (for example, a distortion gauge) attached to a face of the segment 7 which face faces the tread ring, and the means 15 for measuring deviation conducts measurements using a method for testing uniformity of a tire prescribed by JASO (Japanese Automobile Standard Organization), wherein an encoder for detecting a rotation angle inputs a distance from a laser displacement meter measured by the meter in every 45° into a personal computer. Moreover, the controlling means 18 operates the above-mentioned expansion and contraction mechanism and changes an expanding and contracting amount of the segment 7 on the basis of the holding pressure operated by the operation means 17.

Figure 2A:
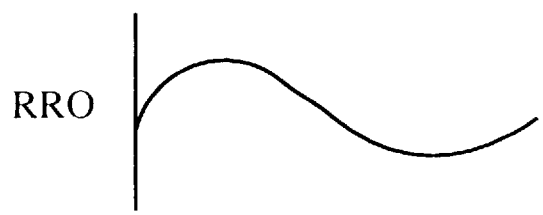
FIG. 2A is a waveform chart.
Figure 2B:
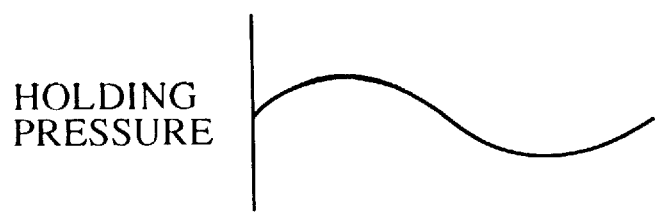
FIG. 2B is a waveform chart.

When the green tire has a waveform (a primary waveform) of RRO as shown in FIG. 2A, the tread ring holding pressure is arranged to have a waveform (a primary waveform) as shown in FIG. 2B which corresponds to the primary waveform of RRO of the green tire shown in FIG. 2A. This is because RRO of a tire to be manufactured is influenced by the tread ring holding pressure of each segment 7 of the transfer 1 and that the RRO of the tire to be manufactured is improved by controlling the tread ring holding pressure.

Next, using the apparatus for manufacturing a tire composed as described above, a tire is manufactured in a method explained below.

First, the tread ring forming drum 3 sticks a belt, a band, and a tread material in a configuration of a ring and forms a cylindrical tread ring W. Next, the tread ring W is taken out by the transfer 1, and is sent to the green tire building drum 4. At this stage, the means 16 for measuring holding pressure measures a holding pressure at which the segments 7 hold the tread ring, and the measured value is inputted into the operation means 17.

The tread ring W fits on the tread ring forming drum 3 when the tread ring W is formed, therefore, in taking out the tread ring W using the transfer 1, the tread ring W is held from its outer circumferential side by the segments 7 of the transfer 1 and a diameter of the segments 2 of the tread ring forming drum 3 is shrank.

Next, while the tread ring W and the carcass ply 50 are united and inflated by the green tire building drum 4, RRO of the green tire is measured by the means 15 for measuring deviation, and the measured value is inputted into the operation means 17.

The operation means 17 compares and operates the value measured by the means 16 for measuring holding pressure and the value measured by the means 15 for measuring deviation, and decides a holding pressure of the segments 7 of the transfer 1 in the next manufacturing process. That is to say, RRO of the green tire is improved by changing the holding pressure, and this improves RRO of the tire after vulcanization.

According to the operated value, the expanding and contracting amount of the segments 7 of the transfer 1 is changed by the controlling means 18, and each segment 7 is arranged to hold at the decided pressure.

Figure 9:
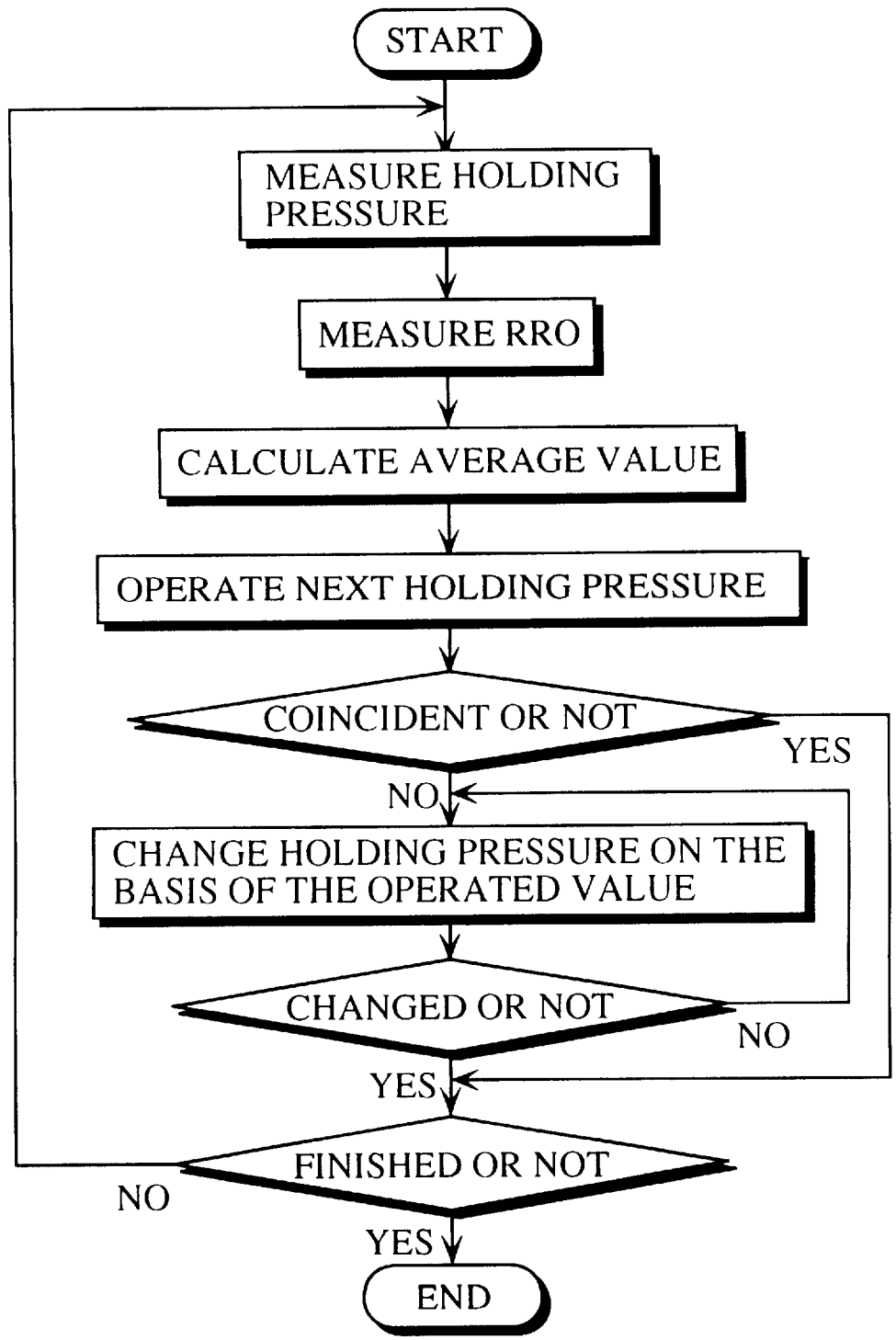
FIG. 9 is a flowchart.

Explaining with reference to the flow chart shown in FIG. 9, first, the holding pressure is measured, next, RRO is measured, and at this stage, an average value of RROs measured several times is calculated. After that, a next holding pressure is operated from the holding pressure and the average RRO. If the measured holding pressure coincides with the next holding pressure, it is unnecessary to change the holding pressure, and if the measured pressure does not coincide with the next pressure, the holding pressure needs to be changed.

Next, whether the pressure was changed or not is judged, and if not changed, the pressure should be changed, and if the pressure was changed, whether the process is finished or not is judged, and if finished, it is the end of the process, and if the process should be continued, the process is repeated from measuring the holding pressure.

The holding pressure is between 1.0 kgf/cm$^2$ and 4.0 kgf/cm$^2$. The RRO is not sufficiently improved if the holding pressure is less than 1.0 kgf/cm$^2$, and if the pressure is above 4.0 kgf/cm$^2$, the green tire deforms in some cases because an inflate internal pressure of the green tire building drum 4 is between 1.0 kgf/cm$^2$ and 2.0 kgf/cm$^2$.

Figure 10:
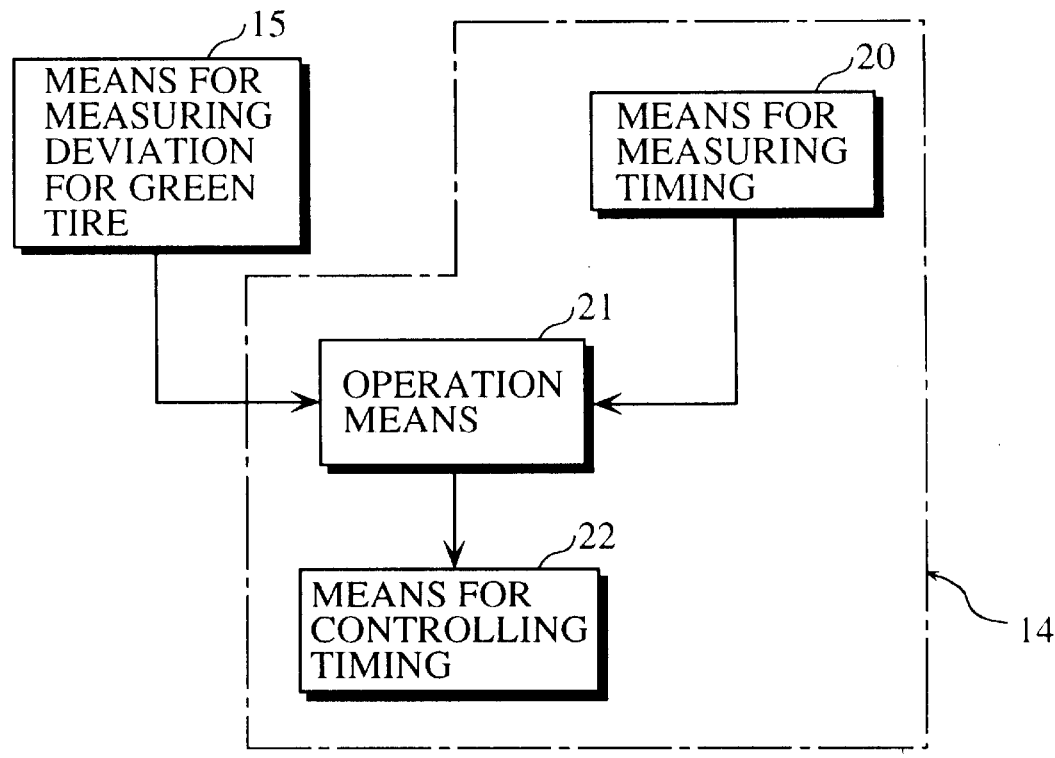
FIG. 10 is a block diagram showing a second apparatus for manufacturing a tire.

As shown in FIG. 10, it is possible to arrange the correcting means 14 to possess means 20 for measuring timing of each segment 7 of the transfer 1 to release the tread ring, operation means 21 for comparing the value of deviation measured by the means 15 for measuring deviation and the value measured by the means 20 for measuring timing and operating the next timing of each segment 7 to release the tread ring, and controlling means 22 for controlling timing of each segment to release the tread ring.

The means 20 for measuring timing is, for example, arranged to obtain change in value of a pressure sensor (for example, a distortion gauge) stuck on a face of the segment 7 which face faces the tread ring and detect the timing to release on the basis of this change. The controlling means 22 operates the expansion and contraction mechanism described above and expands and contracts the segment 7 on the basis of the timing operated by the operation means 21.

Figure 11A:
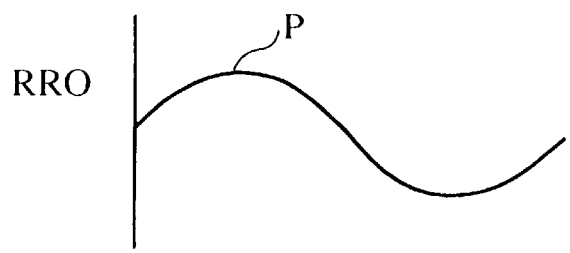
FIG. 11A is a waveform chart.
Figure 11B:
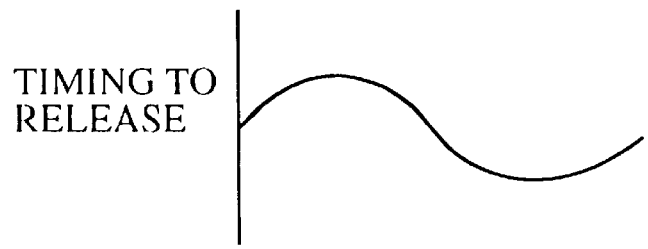
FIG. 11B is a waveform chart.

If the RRO of the green tire has a waveform (a primary waveform) as shown in FIG. 11A, the segment 7 is arranged to release at timing delayed from the peak P of the waveform, or, as shown in FIG. 11B, the waveform of releasing timing of the whole segments 7 is arranged to coincide with the primary waveform of RRO of the green tire in FIG. 11A, because RRO of the tire to be manufactured is influenced by the timing of each segment 7 of the transfer 1 to release the tread ring and the RRO of the tire to be manufactured is improved by controlling the timing to release the tread ring.

Therefore, in order to manufacture a tire using this apparatus for manufacturing a tire, first, the tread ring releasing timing of the segment 7 is measured by the means 20 for measuring timing, and the measured value is inputted into the operation means 21.

Next, when the green tire building drum 4 unites and inflates the tread ring W and the carcass ply 50, the means 15 for measuring deviation measures RRO of this green tire, and the measured value is inputted into the operation means 21.

The operation means 21 compares and operates the value measured by the means 20 for measuring timing and the value measured by the means 15 for measuring deviation, and decides the timing of the segments 7 of the transfer 1 to release the tread ring in the next manufacturing process. That is to say, RRO of the green tire is improved by changing this releasing timing, and this improves RRO of the tire after vulcanization.

According to the operated value, the controlling means 22 changes timing of the segments 7 of the transfer 1 to expand and contract, and each segment 7 releases the tread ring at the decided timing.

Figure 12:
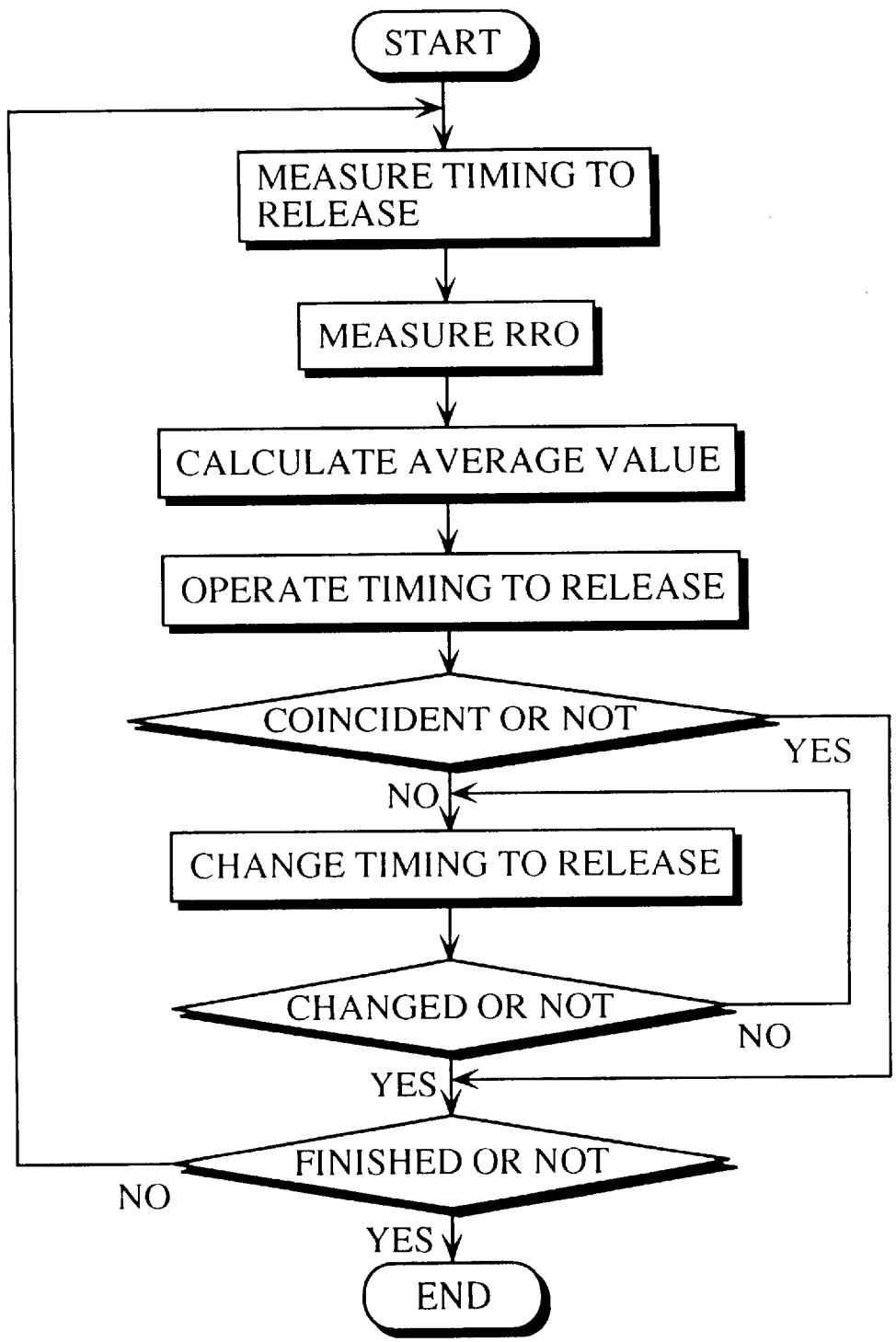
FIG. 12 is a flowchart.

With reference to the flowchart shown in FIG. 12, first, releasing timing is measured, next, RRO is measured, and at this stage, an average value of RROs measured several times is calculated. After that, next releasing timing is operated from the releasing timing and the average RRO. If the measured releasing timing coincides with the next releasing timing, it is needless to change the releasing timing, and if the measured timing does not coincide with the next timing, the releasing timing needs to be changed.

Next, whether the releasing timing was changed or not is judged, and if not changed, the timing needs to be changed, and if changed, whether the process is finished or not is judged, and if finished, this is the end of the process, and if the process should be continued, the process is repeated from measuring the releasing timing.

The segment 7 returns within a time lag of 3 seconds because RRO does not change and loss of time is increased if the time lag is above 3 seconds.

Figure 13:
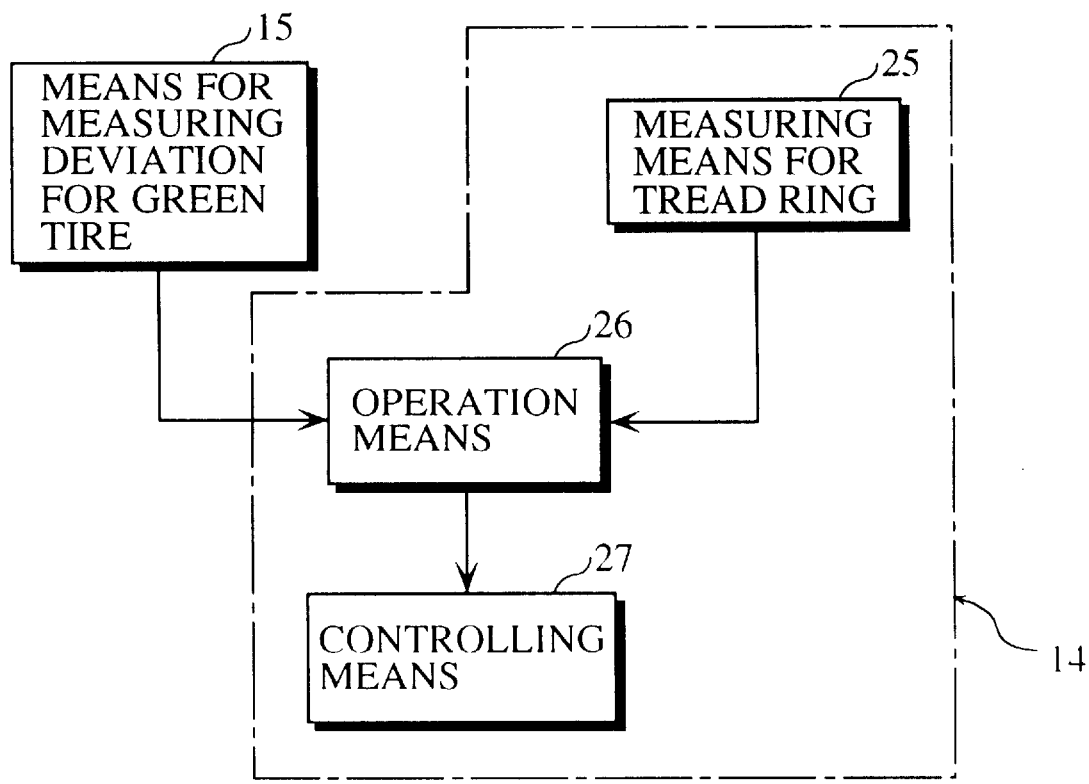
FIG. 13 is a block diagram showing a third apparatus for manufacturing a tire.

The correcting means 14 can be provided with, as shown in FIG. 13, operation means 26 and controlling means 27, wherein the operation means 26 compares and operates a difference between a waveform which is in opposite phase against a waveform of a vertical deviation of the green tire and a waveform of a measured vertical deviation of the segment and the controlling means 27 controls contraction and expansion in a radial direction of the segment 2 of the tread ring forming drum 3 and arranges the waveform of the vertical deviation of the segment to be in opposite phase of the waveform of the vertical deviation of the green tire.

The measuring means 25 for tread ring measures a distance from an axis (a center) to the segment 2, and comprises a displacement sensor such as a laser displacement meter or a differential transformer. Further more, the controlling means 27 operates the above mentioned expansion and contraction mechanism and expand and contract the segment 2 on the basis of the waveform phase operated by the operation means 26.

Figure 14A:
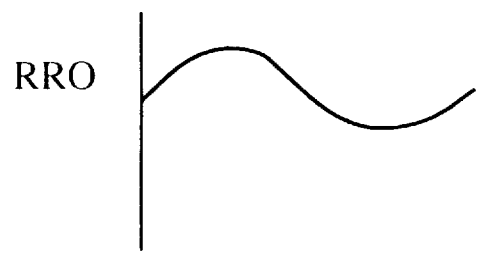
FIG. 14A is a waveform chart.
Figure 14B:
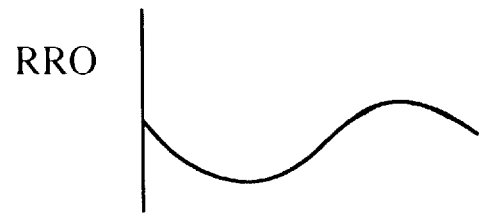
FIG. 14B is a waveform chart.

When the waveform (the primary waveform) of RRO of the green tire is the waveform shown in FIG. 14A, the waveform of RRO of the tread ring is arranged to be the waveform shown in FIG. 14B, or, data of RRO of the green tire is analyzed upon occasion in order to form the tire under an appropriate condition.

A tire is manufactured using this apparatus for manufacturing a tire as follows. The measuring means 25 for tread ring measures RRO of the tread ring of the segments 2 of the tread ring forming drum 3, and the measured value is inputted into the operation means 26. Next, this tread ring W is taken out by the transfer 1 and is sent to the green tire building drum 4.

Then, when the green tire building drum 4 unites and inflates the tread ring W and the carcass ply 50, the means 15 for measuring deviation for green tire measures RRO of this green tire, and the measured value is inputted into the operation means 26.

The operation means 26 compares and operates a difference between a waveform which is in opposite phase against a waveform of a vertical deviation of a green tire and a waveform of a vertical deviation of the segment on the basis of the value measured by the measuring means 25 for tread ring and the value measured by the means 15 for measuring deviation for green tire, and according to the operated value, the controlling means 27 changes expanding and contracting amount of the segments 2 of the tread ring forming drum 3. That is to say, RRO of the green tire is improved by changing the waveform into opposite phase, and this improves RRO of the tire after vulcanization. At this stage, it is necessary to control the whole circumferential length of the segments 2 to be constant while the tread ring is formed.

Figure 15:
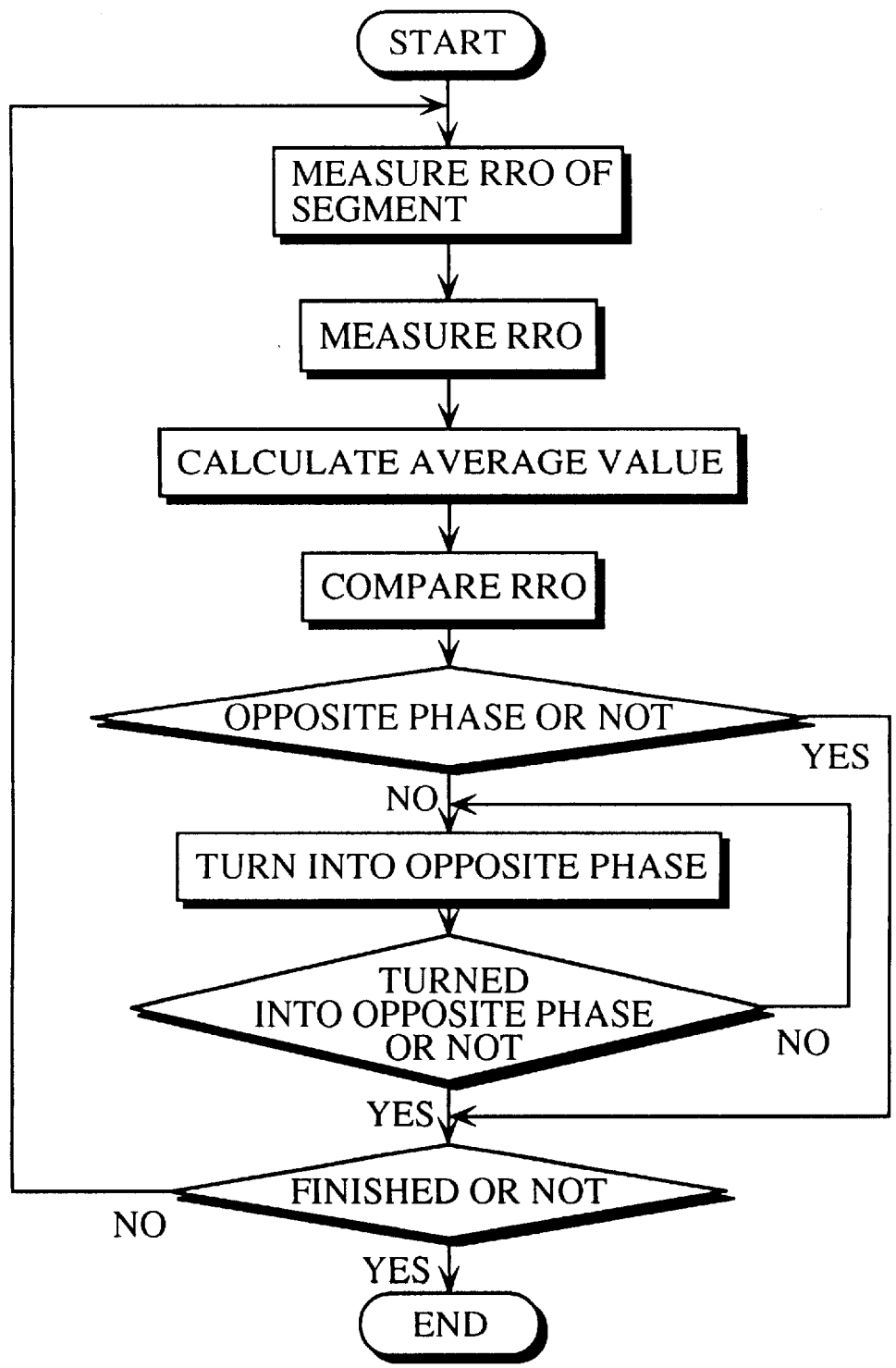
FIG. 15 is a flowchart.

With reference to the flowchart shown in FIG. 15, first, RRO of the segments 2 of the tread ring forming drum 3 is measured, RRO of the green tire is measured, and at this stage, an average value of RROs of the green tire measured several times is calculated. After that, a waveform of the RRO of the segments 2 is turned into opposite phase of a waveform of RRO of the green tire on the basis of the RRO of the segments 2 and the average RRO of the green tire. If the waveform of the RRO of the segments 2 is turned into opposite phase, it is needless to change the phase, and if not, the phase needs to be changed.

Next, whether the phase was changed or not is judged, and if not changed, the phase needs to be changed, and if changed, whether the process is finished or not is judged, and if finished, this is the end of the process, and if the process should be continued, the process is repeated from measuring RRO of the segment.

It is possible to control the green tire to be formed under an appropriate condition by measuring a waveform of RRO of the green tire on the green tire building drum 4 immediately after the green tire is formed and controlling the segments 2 of the tread ring forming drum 3 to be in opposite phase of this average waveform, or, by analyzing data of the RRO of the segments 2 and the RRO of the green tire upon occasion.

The segments 2 of the tread ring forming drum 3 move within a range of 3 mm because a protrusion of the green tire turns into a depression and the RRO deteriorates if the range is above 3 mm.

Figure 16:
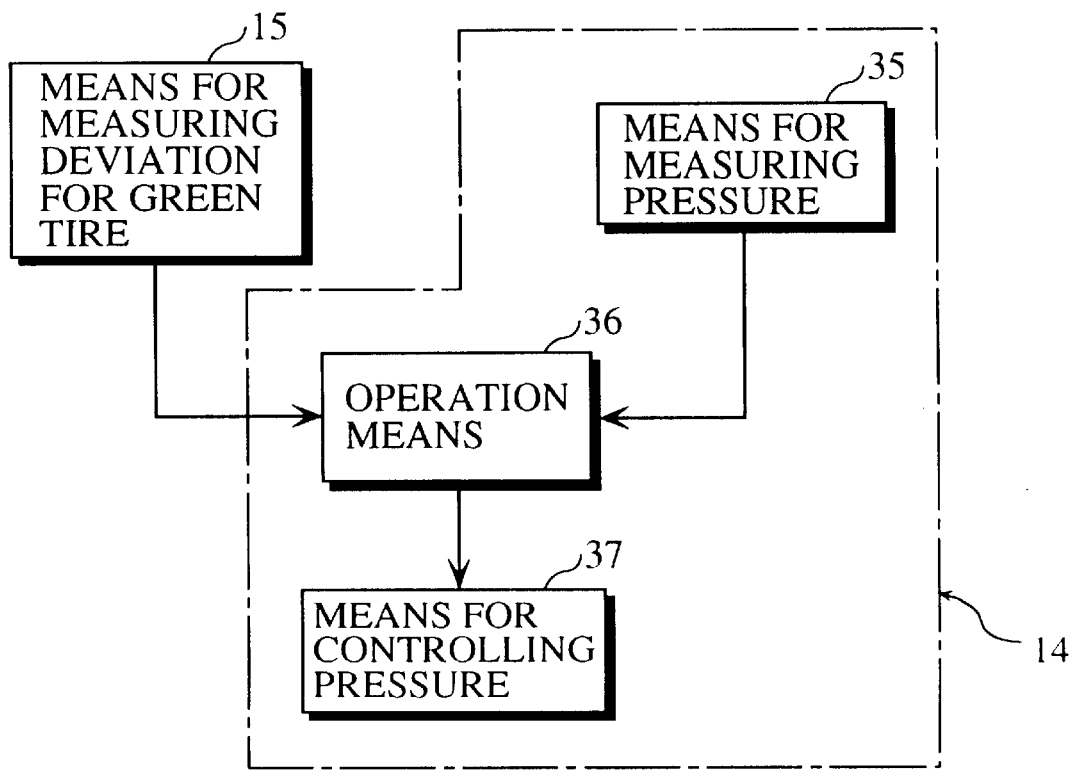
FIG. 16 is a block diagram showing a fourth apparatus for manufacturing a tire.

The correcting means 14 can be provided with, as shown in FIG. 16, means 35 for measuring pressure of the stitcher wheel 31, operation means 36 for comparing the value measured by the means 15 for measuring deviation and the value measured by the means 35 for measuring pressure and deciding the next pressure, and means 37 for controlling pressure of the stitcher wheel on the basis of the value operated by the operation means 36. The means 35 for measuring pressure comprises, for example, an air pressure gauge.

Figure 17A:
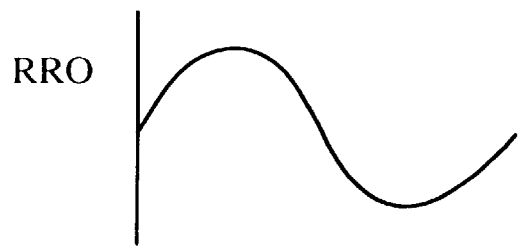
FIG. 17A is a waveform chart.
Figure 17B:
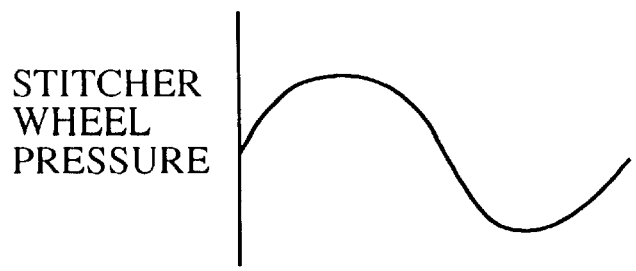
FIG. 17B is a waveform chart.

When the waveform (the primary waveform) of RRO of the green tire is the waveform shown in FIG. 17A, the pressure of the stitcher wheel is arranged to be the waveform shown in FIG. 17B, which coincides with the primary waveform of RRO of the green tire shown in FIG. 17A.

A tire is manufactured using this apparatus for manufacturing a tire as follows. The means 35 for measuring pressure measures a pressure of the stitcher wheel 31, and the measured value is inputted into the operation means 36. When the tread ring W and the carcass ply 50 are united and inflated, the means 15 for measuring deviation measures RRO of this green tire, and the measured value is inputted into the operation means 36.

The operation means 36 compares and operates the value measured by the means 35 for measuring pressure and the value measured by the means 15 for measuring deviation and decides the next pressure.

According to the operated value, the controlling means 37 changes (controls) the pressure of the stitcher wheel 31 along the circumferential direction. The stitcher wheel presses within a range from 0.3 to 3.0 kgf/cm$^2$. When the pressure is less than 0.3 kgf/cm$^2$, the stitch does not work well, and when the pressure is above 3.0 kgf/cm$^2$, the RRO deteriorates because the tread expands and wrinkles.

Figure 18:
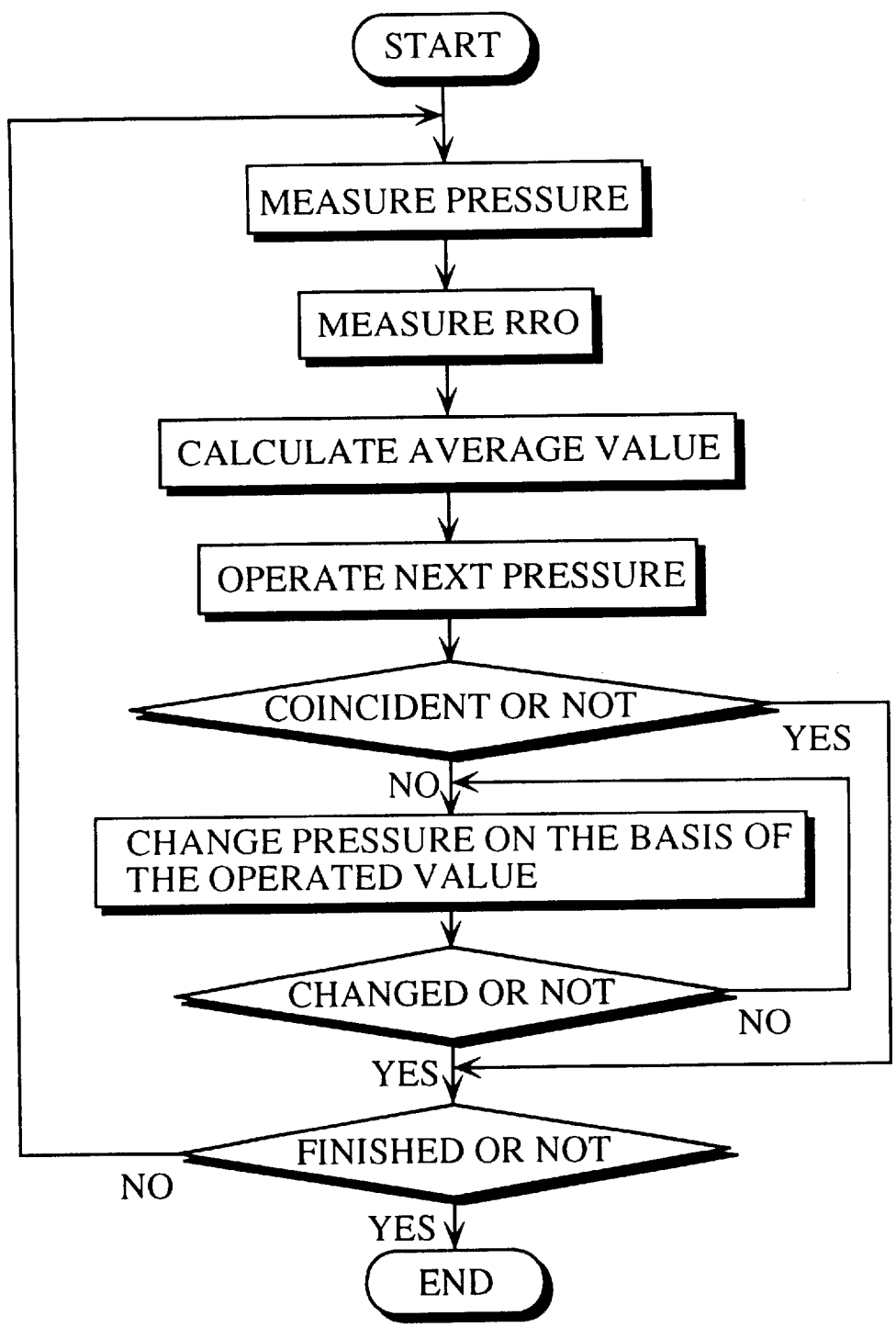
FIG. 18 is a flowchart.

With reference to the flowchart shown in FIG. 18, first, a pressure is measured, next, RRO is measured, and at this stage, an average value of RROs measured several times is calculated. After that, the next pressure is operated from the pressure and the average RRO. If the measured pressure coincides with the next pressure, it is needless to change the pressure, and if not, the pressure needs to be changed.

Next, whether the pressure was changed or not is judged, and if not changed, the pressure needs to be changed, and if changed, whether the process is finished or not is judged, and if finished, this is the end of the process, and if the process should be continued, the process is repeated from measuring the pressure.

The green tire to be formed thereby becomes a complete circle by controlling the pressure.

Figure 7:
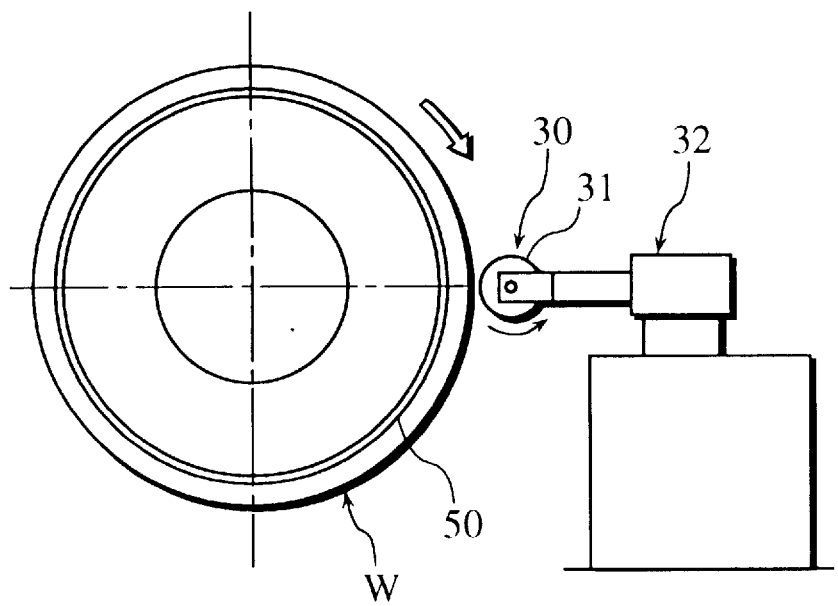
FIG. 7 is a schematic illustration showing a stitcher apparatus.

Instead of controlling the stitcher wheel pressure as described above, it is possible to stitch using a cylinder as illustrated in FIG. 7 and change a pressure of the cylinder by controlling the position of the stitcher wheel 31.

Described below is experimental examples 1, 2, 3, and 4.

A tire manufactured by using the apparatus for manufacturing a tire shown in FIG. 1 as the experimental example 1 and a tire manufactured by using a conventional apparatus were examined on RRO and other values, and the results are shown in Table 1.

TABLE 1

|  | Conventional Example | Experimental Example 1 |
|---|---|---|
| RFV | 5.42 | 4.18 |
| LFV | 2.88 | 2.51 |
| CON | +2.10 | +1.73 |
| RRO | 0.79 | 0.40 |
| RRO of Green Tire | 1.98 | 0.99 |

A tire manufactured by using the apparatus for manufacturing a tire shown in FIG. 10 as the experimental example 2 and a tire manufactured by using a conventional apparatus were examined on RRO and other values, and the results are shown in Table 2.

TABLE 2

|  | Conventional Example | Experimental Example 2 |
|---|---|---|
| RFV | 5.42 | 4.62 |
| LFV | 2.88 | 2.78 |
| CON | +2.10 | +2.02 |
| RRO | 0.79 | 0.61 |
| RRO of Green Tire | 1.98 | 1.54 |

A tire manufactured by using the apparatus for manufacturing a tire shown in FIG. 13 as the experimental example 3 and a tire manufactured by using a conventional apparatus were examined on RRO and other values, and the results are shown in Table 3.

TABLE 3

|  | Conventional Example | Experimental Example 3 |
|---|---|---|
| RFV | 6.38 | 5.99 |
| LFV | 2.91 | 2.76 |
| CON | +1.92 | +1.83 |
| RRO | 0.85 | 0.67 |
| RRO of Green Tire | 2.55 | 2.01 |

A tire manufactured by using the apparatus for manufacturing a tire shown in FIG. 16 as the experimental example 4 and a tire manufactured by using a conventional apparatus were examined on RRO and other values, and the results are shown in Table 4.

TABLE 4

|  | Conventional Example | Experimental Example 4 |
|---|---|---|
| RFV | 6.38 | 5.47 |
| LFV | 2.91 | 2.82 |
| CON | +1.92 | +0.53 |
| RRO | 0.85 | 0.74 |
| RRO of Green Tire | 2.55 | 2.18 |

In Tables 1, 2, 3, and 4, RFV (Radial Force Variation) is a component in a direction of a load, LFV (Lateral Force Variation) is a component perpendicular to a rotating face, and CON (Conicity) is a horizontal force which is applied regardless of a direction of rotation.

The size of the tires is 205/65R15, and 100 samples were made, and the uniformity examination method prescribed by JASO was used in each measurement.

Uniformity data of the present invention is obviously improved in comparison with the conventional method.

Therefore, the present invention provides a tire of good uniformity with accuracy. Changing the holding pressure improves RRO of the green tire, and this improves RRO of the tire after vulcanization. Changing the releasing timing improves RRO of the green tire, and this improves RRO of the tire after vulcanization. Turning the waveform into opposite phase improves RRO of the green tire, and this improves RRO of the tire after vulcanization. Changing pressure of the stitcher wheel 31 improves RRO of the green tire, and this improves RRO of the tire after vulcanization.

While preferred embodiments of the present invention have been described in this specification, it is to be understood that the invention is illustrative and not restrictive, because various changes are possible within the spirit and indispensable features.

What is claimed is:

1. A method of manufacturing a tire in which a transfer having segments arranged along circumferential direction and reciprocated in a radial direction sends a tread ring, held by the segments of the transfer, to a green tire building drum and said green tire building drum unites said tread ring and a carcass ply to form a green tire, wherein the improvement comprises:

after measuring a vertical deviation of said green tire from circularity at said green tire building drum while the green tire is clamped by said green tire building drum, a tire to be manufactured is shaped into a complete circle by adjusting a holding pressure of each segment of said transfer to compensate for the measured deviation.

2. A method of manufacturing a tire in which a tread ring is held by segments, which are arranged along a circumferential direction and reciprocated in a radial direction, of a transfer and is sent to a green tire building drum and said green tire building drum unites said tread ring and a carcass ply to form a green tire, wherein the improvement comprises:

a pressure at which each segment of said transfer holds the tread ring is measured;

a vertical deviation of said green tire from circularity while the green tire is clamped by said green tire building drum is measured;

a pressure for a tire to be manufactured of each segment to hold a tread ring of the tire to be manufactured is determined by comparing the measured deviation and the measured holding pressure; and each segment holds the tread ring of the tire to be manufactured according to the determined pressure to reduce RRO of the tire to be manufactured.

3. An apparatus for manufacturing a tire provided with a green tire building drum for uniting a tread ring with a carcass ply to form a green tire and a transfer having segments arranged along a circumferential direction and reciprocated in a radial direction for holding and sending the tread ring to the green tire building drum, wherein the improvement comprises:

means for measuring a vertical deviation of said green tire from circularity at said green tire building drum while the green tire is clamped by said green tire building drum; and means for correcting a tire to be manufactured into circularity by adjusting the holding pressure of each segment of the transfer to compensate for the measured deviation.

4. An apparatus for manufacturing a tire provided with a green tire building drum for uniting a tread ring and a carcass ply to form a green tire and a transfer having segments arranged along a circumferential direction and reciprocated in a radial direction for holding and sending the tread ring to the green tire building drum, wherein the improvement comprises:

means for measuring a vertical deviation of said green tire from circularity while the green tire is clamped by said green tire building drum;

means for measuring a pressure at which each segment of said transfer holds the tread ring;

operation means for comparing the deviation measured by the means for measuring deviation and the pressure measured by the means for measuring pressure and determining a pressure for the tire to be manufactured at which each segment holds a tread ring of the tire to be manufactured according to the pressure operated by the operation means to reduce the RRO of the tire to be manufactured.

\* \* \* \* \*